March 27, 1934.  A. D. NASH  1,952,454
PROCESS FOR GLASS DESIGNING
Filed April 3, 1933  2 Sheets-Sheet 1
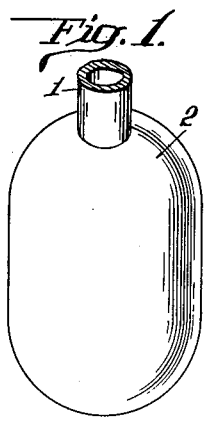
Fig. 1.
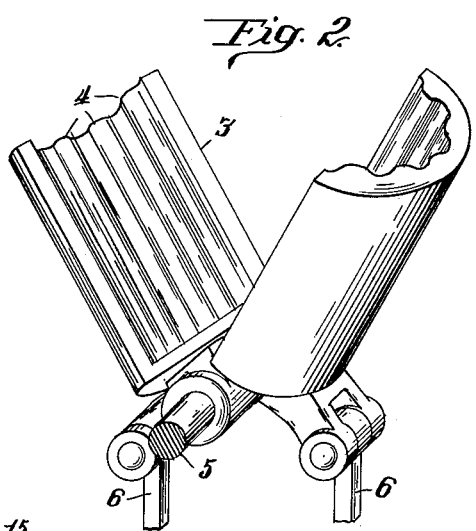
Fig. 2.
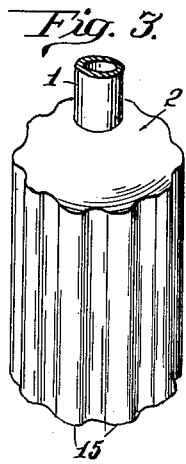
Fig. 3.
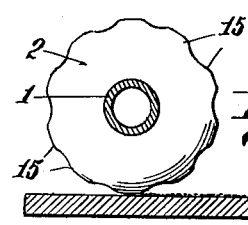
Fig. 4.
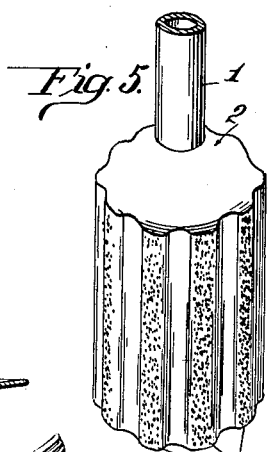
Fig. 5.
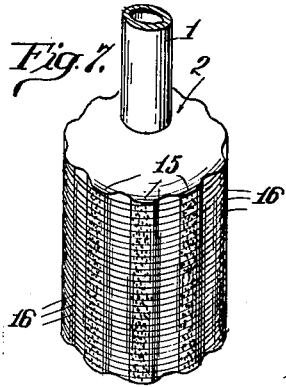
Fig. 7.
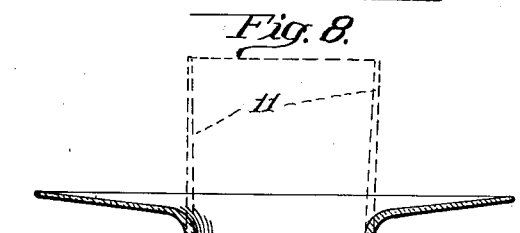
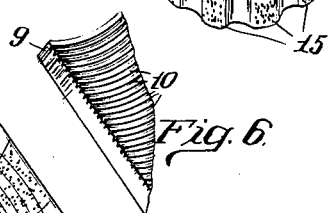
Fig. 8.
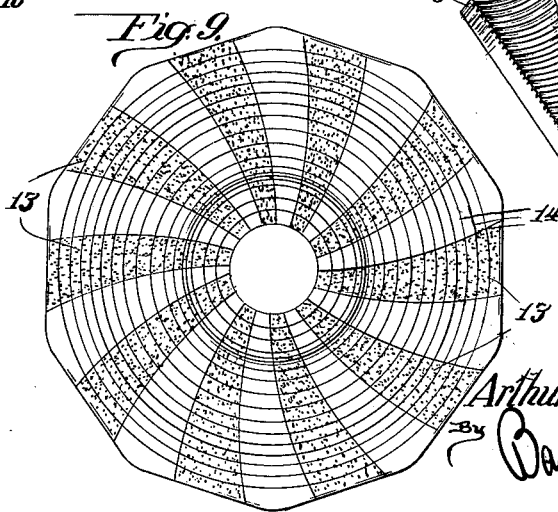
Fig. 9.
Inventor
Arthur Douglas Nash
By Barrett & Sruman
Attorneys March 27, 1934.  A. D. NASH  1,952,454
PROCESS FOR GLASS DESIGNING
Filed April 3, 1933  2 Sheets-Sheet 2
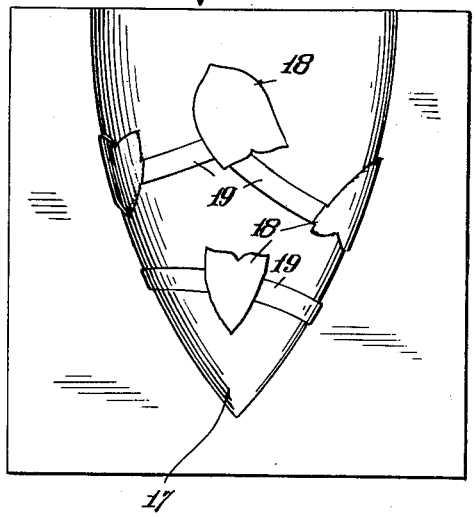
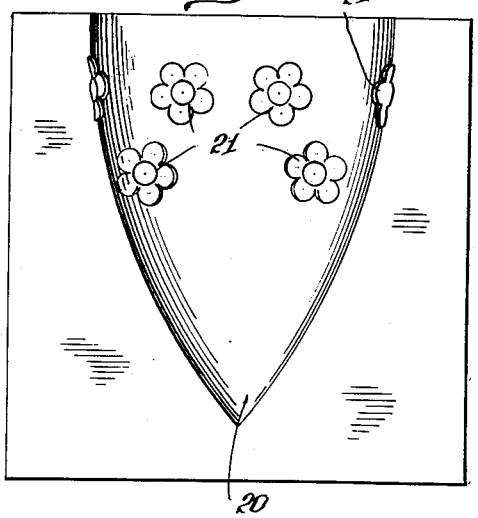
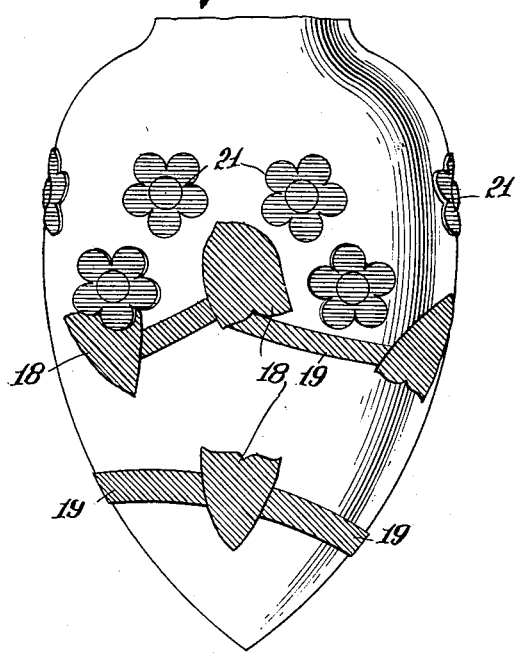
Inventor
Arthur Douglas Nash
By Barrett + Truman
Attorneys Patented Mar. 27, 1934

1,952,454

UNITED STATES PATENT OFFICE

1,952,454

PROCESS FOR GLASS DESIGNING

Arthur Douglas Nash, Toledo, Ohio, assignor to The Libbey Glass Manufacturing Company, Toledo, Ohio, a corporation of Ohio Application April 3, 1933, Serial No. 664,137

10 Claims. (Cl. 49—79)

This invention relates to new and useful improvements in process for glass designing and is particularly directed to blown glassware such as drinking tumblers, goblets, plates and the like.

The primary object is to provide a process of glass treatment whereby the resulting finished article is formed with a more or less uniform or symmetrical design of different colors. However by using the process, the subject matter of this application, almost any design can be obtained and the same or different colors may be used.

In the drawings:

Fig. 1 is a perspective view of a gather of semi-fluid glass hanging from a punty.

Fig. 2 is a perspective view of a mold.

Fig. 3 is a perspective view of the gather of glass after having been subjected to the mold of Fig. 2.

Fig. 4 is a side elevation of a table covered with pulverized glass with the gather resting thereon.

Fig. 5 is a perspective view of the gather after having been rolled on the table.

Fig. 6 is a perspective view of a part of a mold similar to Fig. 2 but having different configuration.

Fig. 7 is a perspective view of the gather after having been subjected to another mold and marver.

Fig. 8 is a side elevation of a finished plate.

Fig. 9 is a plan view of the finished plate showing the design secured.

Fig. 10 is a vertical cross section of a mold of a different design.

Fig. 11 is a view similar to Fig. 10 of another mold.

Fig. 12 is a side elevation of a core or gather after having been subjected to both the molds shown in Figs. 10 and 11.

In detail 1 indicates the punty or blow pipe which takes the gather 2 from the pot containing the molten glass and through which the operator blows to form the desired object. A two part mold 3 formed with vertical ribs 4 mounted on a horizontal pivot rod 5 is adapted to be closed and opened in any desired manner by means of levers 6. In Fig. 4 is indicated a table 7 covered with powdered glass 8 of the desired mesh and color. Another mold 9 is indicated partially in Fig. 6, similar in construction to that shown in Fig. 2 except that it is formed with a plurality of fine horizontal ribs 10. The dotted lines 11 in Fig. 8 represent the sides of the plate 12 before being spread or flared to the finished position shown. The plan view of Fig. 9 indicates the design obtained by the use of the molds shown, the radial colored marks 13 resulting from the treatment of mold 3 and the concentric circles 14 resulting from the mold 9.

In operation: the gather 2 is obtained on the end of the punty 1 and while in semi-fluid state is placed in the mold 3 which is then closed, by foot for example. This accordingly forms the gather or blank into a plurality of vertical ridges 15 which correspond to the spaces between the ridges 4 of the mold 3. The blank is then marvered or rolled over the table 7 upon which has been distributed powdered glass of the mesh and color desired. As the blank is rolled over the table 7 only the ridges 15 contact the glass. The glass adheres to these ridges and remains there throughout the remainder of the process. If only one marking is desired the blank can then be blown to the desired shape, either with or without a mold and the finished article will have the vertical colored marks formed by the powdered glass which adhered to the blank.

In the drawings, however, a more intricate design is illustrated. After the blank has been rolled on the table 7 and the powdered glass of given mesh and color has adhered to the vertical ridges, the blank is reheated to a sufficient degree to maintain its moldability and is then subjected to another mold 9 provided with a plurality of fine horizontal ribs 10. A plurality of horizontal projections or ribs 16 results and as it is then rolled over a table similar to 7 upon which has been placed powdered glass of a fine mesh and a different color this glass adheres to the projecting horizontal ribs and the blank then appears as in Fig. 7. It is to be noted that when subjected to the second mold the vertical ridges and troughs practically disappear, the powdered glass that adhered to the ridges however maintaining its relative position. The second mold will therefore form continuous horizontal ribs around the circumference of the glass blank.

At this stage the operator blows the blank to the hollow shape indicated by the dotted lines in Fig. 8 and then flares the sides 11 until they assume the position shown in full in Fig. 8. The plate is then finished so far as this process is involved and the design obtained is clearly shown in the plan view, Fig. 9.

It is understood that this invention is not limited to the design here shown but includes the subjecting of semi-fluid glass blanks to one or more molds of any desired contour and then rolling or marvering over powdered glass of any desired mesh or color in any desired combination.

As a further example Fig. 10 illustrates a mold 17 provided with incised designs representing leaves 18 and stems 19. A gather such as shown in Fig. 1 is subjected to this mold and is then marvered over powdered green glass which adheres to the raised leaves and stems. After slightly reheating the gather is then subjected to mold 20, Fig. 11, which is provided with incised ornamentation representing flowers 21. The gather is then rolled through powdered glass of the desired color, blue for example, which adheres to the raised flowers and the resulting core or gather appears as shown in Fig. 12. It may then be blown to the desired shape, the finished article being provided with a design composed of green leaves and stems and blue flowers.

I claim:

1. A process of designing a glass article comprising molding a semi-fluid glass blank so that its outer surface is formed with raised portions, moving said blank so formed over powdered glass of the desired mesh and color, reheating said blank, remolding said blank to form other projections on its outer surface, again moving said blank through powdered glass of desired mesh and color and then blowing said blank to finished form.

2. A process of designing a glass article comprising molding a semi-fluid glass blank so that its outer surface is formed with raised portions, moving said blank so formed over powdered glass of the desired mesh and color, reheating said blank, remolding said blank to form other projections on its outer surface, again moving said blank through powdered glass of desired mesh and color, repeating said reheating, remolding and moving actions until the desired design is secured and then blowing said blank to finished form.

3. A process of designing a glass article comprising molding a semi-fluid glass blank to form its outer surface with projecting surfaces, contacting said projecting surfaces with powdered glass of desired mesh and color, remolding said blank to form other projecting surfaces, contacting said other projecting surfaces with powdered glass of the desired mesh and color and then shaping said blank to finished form.

4. A process of designing a glass article comprising molding a semi-fluid glass blank to form its outer surface with projecting surfaces, rolling said blank over a surface on which is placed powdered glass of the desired mesh and color so that said projecting surfaces contact and pick up said powdered glass, reheating said blank, again molding said blank to form other projecting surfaces, re-rolling said blank over a surface covered with powdered glass of desired color, repeating said steps until the desired design and color combination has been obtained and then finishing said blank.

5. A process of designing a glass article comprising the forming of vertical ribs on a semi-fluid glass blank, contacting said ribs with powdered glass of desired color, reheating said blank, forming horizontal ribs on the outer surface of said blank, contacting said ribs with powdered glass of the desired color and finishing said blank to the desired shape.

6. A process for designing a glass article comprising forming the outer surface of a semi-fluid glass blank with raised portions having the shape of leaves and stems, rolling said blank so formed through powdered glass of the color of the leaves and stems, reheating said blank to maintain its semi-fluidity, forming the outer surface with raised portions having the shape of flowers, rolling said blank so formed through powdered glass of the color of the flowers and then blowing said blank to the desired form.

7. A process for designing a glass article comprising forming the outer surface of a semi-fluid glass blank with raised portions having the shape of the parts of a design having the same color, rolling said blank through powdered glass of the color corresponding to the color of said parts, reheating said blank, forming the outer surface with raised portions having the shape of other parts of said design having a uniform color but different than said first parts, rolling said blank through powdered glass of said different color, repeating said steps until the design is completed and then blowing and shaping said blank to desired form.

8. A process for designing a glass article comprising molding a semi-fluid glass blank so that its surface presents raised portions of the shape of the same colored parts of a floral design, subjecting said raised portions to powdered glass having the corresponding color, remolding the blank so that its surface presents raised portions of the shape of other same colored parts of the design, subjecting said raised portions to powdered glass of the same color as the said other parts of the floral design and finishing said blank to desired shape.

9. A process of designing a glass plate comprising the forming of a semi-fluid glass blank with projecting surfaces, contacting said surfaces with powdered glass of desired color, reheating said blank, forming said reheated blank with other projecting surfaces, contacting said other projecting surfaces with powdered glass of desired color, blowing said blank to cup shape and flaring the sides of said cup to form the plate.

10. A process for glass designing comprising the taking of a gather of molten glass by means of a punty, forming said gather into a blank having a plurality of vertical ribs, rolling said blank on a surface covered with powdered glass of a given color, reheating said blank, forming said reheated blank to give it a plurality of horizontal ribs, rolling said blank on a surface covered with powdered glass of a different color, and blowing said blank to desired shape.

ARTHUR DOUGLAS NASH.